Nov. 21, 1939.   J. W. SMITH   2,181,001

POWER-TRANSMITTING BELT

Filed Nov. 12, 1936

INVENTOR.
John W. Smith
BY
ATTORNEY.

Patented Nov. 21, 1939

2,181,001

UNITED STATES PATENT OFFICE 2,181,001

POWER-TRANSMITTING BELT

John W. Smith, Lakewood, Ohio

Application November 12, 1936, Serial No. 110,465

2 Claims. (Cl. 74—231)

My invention pertains to a power-transmission belt and to the method of its manufacture.

Power belts of whatever material (natural or artificial composition) besides being of adequate tensile strength, must possess the merit of requisite pull or driving effectiveness with consideration of their conventional crown faces and expectable speed of travel. Their undue wear attends the occurrence of avoidable excessive friction caused either by slippage in either of two relatively transverse directions or by whipping and attendant flapping. Belts may not be so tightly mounted as to minimize slippage because of the consequential difficulty of lateral shifting manually from one pulley to another during operation. My decades of experience in the belting business has brought familiarity with its problems and with patented proposals and commercial adoptions intended to solve them or at least to achieve demonstrable improvements. Roughened inner face or pulley-contacting belt surfaces have been used. As instances; the rougher side of tanned pig skin, but that leather having more irregular margins requires more trimming and coming in shorter lengths than steer-hide requires more splicing—consequently is more expensive. Pulleys have been supplied with peripheral indentations to serve as vacuum cups, but are special and rather costly equipment. Belts have also been supplied with holes and with sharp bottomed cavities and the proposal published, yet not commercially introduced which suggested provision of cup-shaped cavities in one side of a belt.

The object of my invention is the production of a durable and sufficiently economical belt having artificially formed yet correctly sized, formed and spaced suction cavities for apposition to the pulleys and for realization of better pull.

I have experimentally determined that belts may be successfully supplied with vacuum cavities provided the latter (1) are regularly spaced (preferably not staggered, but in rows parallel with and perpendicular to the edges of the belt), (2) are of uniform depth, (3) are not formed by removal of material to weaken the belt, (4) have their contour lying somewhere between spherical curvature and pyramidal form to approach parabolic curvature and (5) are formed and treated in such a manner as to cause a lasting "set" against shallowing deformation. If a belt is to be made of animal hide the natural leather should be hard, firm and non-piping. The cavities are then impressed in the presence of artificial heat and variable oils together with a waxy substance thereby causing penetration of the mixture into the belting material and achieving a lasting "set" of the vacuum cup conformations. When single ply stretched leather is to be used, an unglazed side is exposed to a heated solution of the oil or oils and the waxy substance until a sufficient amount has been absorbed and thereafter the cavities of peculiar contour are impressed into the roughened side while the requisite artificial heat still obtains. The oil as the penetrating vehicle and the waxy substance as the induratable, setting or fixing material will be appropriately chosen to suit the ply, texture or kind of material to be employed for the belting. For the manufacture of narrow belting the indenting and indurating process may be performed by passage between die pressure rollers. The larger areas involve greater irregularities (especially of thickness) in the leather stock so that pressing hydraulically between flat dies becomes preferable.

It is to be realized that the scope of my invention comprehends many equivalent methods and constructions. The showing of the drawing and the particular description are merely specific exemplifications of a plurality of successful mechanical embodiments, arrangements and performances.

Figure 1:
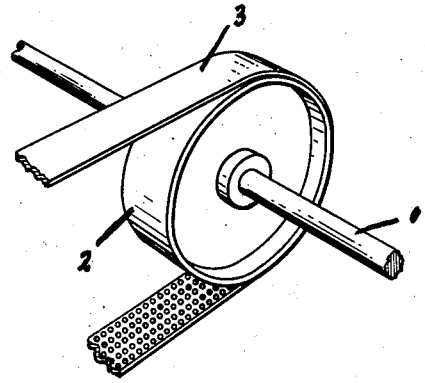
Figure 1 is a perspective view showing a broken portion of a power transmission belt embodying my invention and operatively mounted upon a pulley carried by a countershaft.
Figure 2:
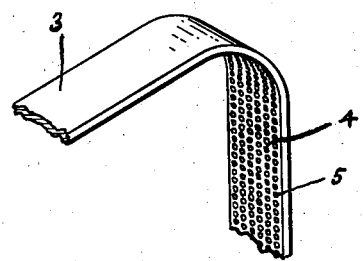
Figure 2 is a somewhat enlarged perspective view of the bowed belt section showing above its smooth glazed side and showing its roughened inner curved side formed with cavities of distinctive conformation.
Figure 3:
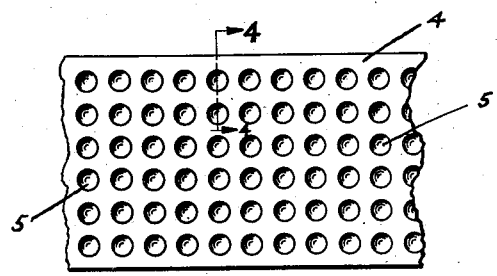
Figure 3 is a further enlarged plan view of the cavity side of my belt, the material of which the belt is composed being darkened in consequence of impregnation with a cavity-setting substance.
Figure 4:
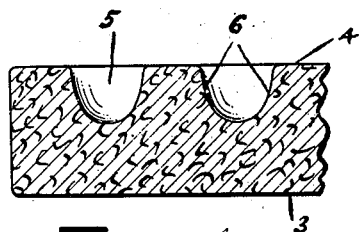
Figure 4 is a still further enlarged cross-sectional view on line 4—4 of Fig. 3 to show the contour of the cavities.

The drawing exemplifies application of my belt in association with a countershaft 1 and partially around a pulley 2 which is fixedly carried by the shaft 1. A power transmission belt constructed after the manner of my invention may have one (the outer) side a smooth or glazed surface 3, whereas its inner pulley-contacting side 4 is preferably unglazed or even artificially roughened.

The inner side 4 of the belting is fashioned with regularly spaced cavities 5 of predetermined uniform depth and contour. The defining wall of the cavity has been designated by the numeral 6 and it is to be observed that the cup-shaped cavities are somewhat relieved from hemispherical shape, which is to imply, that they are given a contour between that of hemispherical and parabolical. Their bottoms are substantially hemispherical and outwardly beyond they taper to greater diameter and then flare so as to merge into the approached side of the belt. Such a contour I have empirically discovered and determined to be demonstrably more effective for realizing the desired vacuum grip upon a pulley than pyramidally, conically or hemispherically defined cavities. Moreover, I have determined that the spacing of the cavities should be as close as possible without weakening of the belt, should not be in staggered relation because that weakens or tends to distort the belt and interrupts the continuous flat areas extending from side to side between the crosswise-alined row of cavities and should have a carefully chosen depth with relation to the thickness of the belt.

Because the composition of which belting is composed, especially leather, is commonly compressible, but not possessed of the property of maintaining pressure indentations without progressive deformation from the contour originally established, it becomes important to provide means for resisting deformation of the established contour given to vacuum cavities. According to my invention the contour-maintaining means consists of a chemical impregnation of the material of which the belt is composed, or at least impregnation around the areas which define its cavities. I have succeeded in effecting a lasting "set" of the vacuum cup contour by employing a suitable oil or oils in heated solution with a suitable waxy substance. I first cause penetration or permeation of the belting material by such heated solution, preferably by exposure of the roughened or unglazed side and then while the heated condition is maintained impressing into such roughened side the series of cavities. After the belting has cooled the waxy substance acts as an indurating material or "setting" substance and incidentally serves as a smooth yet flexible veneer to frustrate lodgement of dust, grit or other deleterious matter.

I claim:

1. A power-transmission belt having its one side provided with spaced cavities alined crosswise and of predetermined uniform depth and contour, the contour of each of said cavities being of approximately semi-oval shape with substantially hemi-spherical bottoms of widening outward taper nearer their margins and flared there into the approached side of the belt.

2. A leather belt fashioned on one face with predeterminedly spaced and arranged cavities of predetermined contour, said cavities being depressed in the face of the belt and the contours comprising approximately semi-spherically surfaced bottoms merging into outwardly diverging generally conical side walls, said side walls merging into the belt surface with an outwardly flaring radius.

JOHN W. SMITH.